United States Patent
Kuramoto et al.

(10) Patent No.: US 7,166,661 B2
(45) Date of Patent: Jan. 23, 2007

(54) ORGANIC-INORGANIC COMPOSITE MATERIAL AND LAMINATE, OPTICAL WAVEGUIDE AND LIGHT TRANSMISSION STRUCTURE COMPRISING THE SAME

(75) Inventors: Keiichi Kuramoto, Kakoma (JP); Hiroaki Izu, Hirakata (JP); Koji Yamano, Hirakata (JP); Hitoshi Hirano, Nishinomiya (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 274 days.

(21) Appl. No.: 10/791,627

(22) Filed: Mar. 1, 2004

(65) Prior Publication Data

US 2004/0191539 A1    Sep. 30, 2004

Related U.S. Application Data

(62) Division of application No. 10/346,340, filed on Jan. 16, 2003, now Pat. No. 6,723,770.

(30) Foreign Application Priority Data

| Jan. 18, 2002 | (JP) | 2002-9994 |
| Jan. 31, 2002 | (JP) | 2002-22744 |
| Dec. 27, 2002 | (JP) | 2002-381185 |

(51) Int. Cl.
*C08J 5/10* (2006.01)

(52) U.S. Cl. ............... 524/261; 524/262; 526/314; 526/262; 526/329.7; 526/316; 526/279

(58) Field of Classification Search ............ 428/205, 428/209; 526/314, 262, 329.7, 316, 279; 524/261, 262
See application file for complete search history.

(56) References Cited

U.S. PATENT DOCUMENTS 6,395,341 B1 * 5/2002 Arakawa et al. ......... 427/419.1

6,632,585 B1    10/2003 Nakamura

FOREIGN PATENT DOCUMENTS

| EP | 0997497 | 5/2000 |
| EP | 0 997 497 A1 * | 5/2002 |
| JP | 9-311234 | 12/1997 |
| JP | 10-101717 | 4/1998 |
| JP | 2000034413 | 2/2000 |
| JP | 2000336281 | 12/2000 |
| WO | WO 01/037049 | 5/2001 |

OTHER PUBLICATIONS

Toki et al., Polymer Bulletin, 29, 653-660 (1992).*
Yang et al., Die Angewandte Makromolekulare Chemie, 251, 49-60 (1997.*
"Syrructure of poly(vinylpyrrolidone)-silica hybrid", Motoyuki Toki et al., Polymer Bulletin 29, 653-660 (1992).
"Organic-inorganic hybrid sol-gel materials, 1", Jen Ming Yang et al., Die Angewandte Makromolekulare Chemi 251 (1997) pp. 49-60 (Nr. 4356).
English Translation of JP 09-311234 published Dec. 1997.
English Translation of JP 10-101717 published Apr. 1998.

* cited by examiner

*Primary Examiner*—Ling-Sui Choi
(74) *Attorney, Agent, or Firm*—W. F. Fasse; W. G. Fasse

(57) ABSTRACT

An organic-inorganic composite material is formed by polycondensating a metal alkoxide through hydrolysis until the unreacted metal alkoxide is reduced to 3 vol. % or less, and mixing it with an organic polymer. The composite material has a light transmittance of at least 90% per 10 μm material thickness for light of 600 to 1000 nm. The metal element content of the composite material is preferably 0.1 to 46 wt. %, more preferably 5 to 37 wt. %. By laminating layers of such organic-inorganic composite materials having respective different compositions, the resulting laminate has a concentration gradient wherein the metal element content increases or decreases monotonously, or increases and decreases in succession, from one side to the other side of the laminate. The resulting refractive index varies opposite the metal element content. The material can be used for an optical waveguide or a light transmission structure.

15 Claims, 7 Drawing Sheets

DISTANCE FROM SUBSTRATE SURFACE (μm)

ORGANIC-INORGANIC COMPOSITE MATERIAL AND LAMINATE, OPTICAL WAVEGUIDE AND LIGHT TRANSMISSION STRUCTURE COMPRISING THE SAME

CROSS-REFERENCE TO RELATED APPLICATION

This application is a Divisional of U.S. application Ser. No. 10/346,340, filed Jan. 16, 2003, now U.S. Pat. No. 6,723,770 issued Apr. 20, 2004.

BACKGROUND OF THE INVENTION

1. Field of the Invention

The present invention relates to an organic-inorganic composite material formed from an organic polymer and a metal alkoxide, and a laminate, an optical waveguide and a light transmission structure including the composite material.

2. Related Art

Inorganic materials such as metal and ceramics are excellent in heat resistance, mechanical strength, electrical properties, optical properties, chemical stability etc., and used widely in industry by utilizing these properties. However, these materials are generally highly brittle and rigid, and their use may be limited because work or mechanical processing at a high temperature is necessary for working them into a desired shape.

On the other hand, organic polymers are excellent in workability and have flexibility, so that they can be easily worked into a desired shape. However, the organic polymers are often inferior to the inorganic materials in heat resistance and chemical stability.

Hence, attention is attracted in recent years to an organic-inorganic composite material comprising an inorganic material and an organic polymer material to attain the properties of the two.

As the composite material of an organic polymer and an inorganic material, a composite material having an inorganic material in a fibrous or powdery form dispersed in an organic polymer material has been used in various fields. In recent years, there is extensive development of an organic-inorganic nano-composite material (also called an organic-inorganic hybrid material) in which organic and inorganic regions are compounded at the nanometer level or molecular level.

Because the organic and inorganic regions can be dispersed at the nanometer level or molecular level, the organic-inorganic nano-composite material is used as a material for electronic components or as a material for mechanical components. Further, the organic or inorganic region in the material can be designed to be smaller than light wavelength, thus making light absorption and scattering low. Accordingly, the organic-inorganic nano-composite material has been studied to be used as a material for optical waveguide, optical fiber, or the like by providing optical transparency.

Methods of producing organic-inorganic composite materials are disclosed in "Structure of poly (vinylpyrrolidone)-silica hybrid", Motoyuki Toki, et al., Polymer Bulletin 29, 653–660 (1992) and in "Organic-inorganic hybrid sol-gel materials, 1", Jen Ming Yang, et al., Die Angewandte Makromolekulare Chemi 251 (1997) 49–60 (Nr. 4356) etc.

However, the production methods described in these literatures have a problem that organic-inorganic composite materials excellent in optical transparency cannot be obtained.

When the organic-inorganic nano-composite material is used as an optical waveguide, its light transmission layer is often formed on a substrate. In this case, the adhesion of the substrate to the light transmission layer is important.

For the purpose of improving the adhesion, it has been attempted to provide a graded structure with the material by continuously changing its composition.

For example, in Japanese Patent Laid-Open No. 34413 (2000), proposed is a silica/polycarbonate-based composite material wherein the concentration of silica is continuously changed by applying successively a plurality of coating solutions different in the composition of organic and inorganic components on a substrate.

Further, in Japanese Patent Laid-Open No. 336281(2000), proposed is a graded structure prepared by applying a coating solution consisting of a mixture of an organic polymer and a metal compound capable of forming a metal oxide by hydrolysis on an organic substrate, then heating and drying it, the graded structure having a higher content of the organic component at the side of the substrate and a higher content of the inorganic component in the vicinity of the surface.

However, the methods proposed in the publications described above have a problem that the adhesion of the light transmission layer to the substrate cannot be sufficiently improved.

SUMMARY OF THE INVENTION

A first object of the present invention is to provide a production method capable of producing an organic-inorganic composite material excellent in optical transparency, as well as an organic-inorganic composite material obtainable by this method.

A second object of the present invention is to provide a light transmission structure having a light transmission layer with improved adhesion to a substrate.

The production method of the present invention is a method of producing an organic-inorganic composite material formed from an organic polymer and a metal alkoxide, which comprises the steps of polycondensating a metal alkoxide through hydrolysis until the unreacted metal alkoxide is reduced to 3 vol. % or less, and mixing the polycondensated metal alkoxide with an organic polymer to form an organic-inorganic composite material.

In the present invention, a metal alkoxide is polycondensated through hydrolysis until the unreacted metal alkoxide is reduced to 3 vol. % or less, and the polycondensated metal alkoxide is mixed with an organic polymer to form an organic-inorganic composite material. The obtained organic-inorganic composite material is excellent in optical transparency. Thus, according to the present invention, an organic-inorganic composite material suitable as a material for optical component such as optical waveguide or optical fiber can be produced.

The metal alkoxide used in the present invention includes alkoxides of metals such as Si, Ti, Zr, Al, Sn and Zn. In particular, Si, Ti or Zr alkoxide is preferably used. Accordingly, alkoxy silane, titanium alkoxide and zirconium alkoxide are preferably used, and particularly alkoxy silane is preferably used. The alkoxy silane includes tetraethoxy silane, tetramethoxy silane, tetra-n-propoxy silane, tetraisopropoxy silane, tetra-n-butoxy silane, tetraisobutoxy silane, phenyltriethoxy silane, phenyltrimethoxy silane, 3-methacryloxypropyltriethoxy silane, and 3-methacryloxypropyltrimethoxy silane.

The organic polymer in the present invention is not particularly limited insofar as it forms an organic-inorganic composite material with a metal alkoxide. The organic polymer includes, for example, polyvinylpyrrolidone, polycarbonate, polymethylmethacrylate, polyamides, polyimides, polystyrene, polyethylene, polypropylene, epoxy resins, phenol resins, acryl resins, urea resins, melamine resins etc. From the viewpoint of formation of the organic-inorganic composite material excellent in optical transparency, polyvinylpyrrolidone, polycarbonate, polymethylmethacrylate, polystyrene or a mixture thereof is used preferably as the organic polymer.

Hydrolysis of the metal alkoxide is conducted preferably in the presence of water for hydrolysis and an acid as a catalyst for hydrolysis. The molar ratio of water for hydrolysis to the metal alkoxide (water/metal alkoxide ratio) is preferably from 1.0 to 3.0, more preferably from 1.5 to 2.5. The acid used as a catalyst for hydrolysis includes inorganic acids such as hydrochloric acid, nitric acid and sulfuric acid, as well as organic acids, and particularly hydrochloric acid is preferably used. The molar ratio of hydrochloric acid to the metal alkoxide (hydrochloric acid/metal alkoxide ratio) is preferably from 0.001 to 0.5, more preferably from 0.001 to 0.01, particularly preferably 0.002.

The amount of the unreacted metal alkoxide, that is, the amount of the remaining metal alkoxide, can be measured by gas chromatography etc. The reaction time in which the amount of the remaining metal alkoxide is reduced to 3 vol. % or less is previously determined by hydrolyzing the metal alkoxide under predetermined conditions of temperature, concentration etc., and for the determined reaction time, the metal alkoxide is hydrolyzed and polycondensated, and then mixed with an organic polymer to form an organic-inorganic composite material. Alternatively, the amount of the unreacted metal alkoxide may be measured every time the composite material is formed.

The organic-inorganic composite material of the present invention is characterized by being produced by the production method of the present invention described above. The organic-inorganic composite material of the present invention can be formed for example by preparing a mixed coating solution of a solution of hydrolyzed and polycondensated metal alkoxide and an organic polymer and then applying the mixed solution. Such a coating solution can be applied onto a substrate to form an organic-inorganic composite material on the substrate. As the substrate, a substrate composed of an organic or metal material can be used. When the organic-inorganic composite material of the present invention is used as an optical material, the organic-inorganic composite material may be formed on a transparent substrate.

When the organic-inorganic composite material of the present invention has a thickness of 10 μm, it can exhibit 90% transmittance of light of a wavelength of 600 to 1000 nm. The content of the metal element in the organic-inorganic composite material of the present invention is preferably 0.1 to 46 wt. %, more preferably 5 to 37 wt. %.

The laminate of the present invention has a structure wherein the organic-inorganic composite material produced by the above-described production method of the present invention is laminated. For example, a plurality of mixtures different in the content of metal alkoxide can be applied one after another to form a laminate having a different content of metal alkoxide in each layer.

The laminate in the first aspect of the present invention has a concentration gradation wherein the metal element of the metal alkoxide is increased or decreased from one side to the other side of the laminate. Generally, the refractive index of the organic-inorganic composite material can be changed by changing the concentration of the metal element in the organic-inorganic composite material. Accordingly, the laminate in the first aspect of the present invention can be provided with a graded structure in which refractive index is increased or decreased from one side to the other side of the laminate by grading the concentration of the metal element. The laminate having this graded structure can be used as a material for optical components such as optical waveguides and optical fibers.

The laminate in the second aspect of the present invention has a concentration gradation wherein the metal element of the metal alkoxide is first increased and then decreased from one side to the other side of the laminate. Accordingly, the laminate in the second aspect of the present invention can be provided with a graded structure in which refractive index is first decreased and then increased from one side to the other side of the laminate.

The laminate in the third aspect of the present invention has a concentration gradation wherein the metal element of the metal alkoxide is first decreased and then increased from one side to the other side of the laminate. Accordingly, the laminate in the third aspect of the present invention can be provided with a graded structure in which refractive index is first increased and then decreased from one side to the other side of the laminate.

Like the laminate in the first aspect, the laminates in the second and third aspects can be used as a material for optical components such as optical waveguides or optical fibers insofar as they have the above-described structure of graded refractive index.

The light transmission structure of the present invention comprises a metallic substrate, a metal oxide layer arranged on the substrate, and a light transmission layer composed of an organic-inorganic composite material provided on the metal oxide layer.

In the present invention, the metal oxide layer is arranged between a substrate and a light transmission layer composed of the organic-inorganic composite material. By arranging the metal oxide layer, the adhesion of the light transmission layer to the substrate can be improved.

The substrate in the present invention is not particularly limited insofar as it is made of a metal, and is exemplified by a substrate made of Si, Al, Ge, Cu, Fe, Ni, Zr, Sn, Zn or Ti.

The metal oxide layer is preferably an oxide layer containing at least one element contained in the substrate. For example, when the substrate is a silicon substrate or a silicon alloy substrate, the metal oxide layer is preferably a Si oxide layer.

The thickness of the metal oxide layer is preferably 5 nm to 20 μm, more preferably 50 nm to 5 μm. If the metal oxide layer is too thin, the effect of improving adhesion may not be sufficiently achieved, while if the metal oxide layer is too thick, the adhesion may be lowered due to stress upon formation of the metal oxide layer itself.

The method of forming the metal oxide layer in the present invention includes, but is not limited to, reactive vapor deposition, sputtering, CVD, and PVD. Alternatively, the metal oxide layer may be formed by heating oxidation, a sol-gel process of hydrolyzing and polycondensating a metal alkoxide, or a wet process such as anodization. The metal oxide layer may also be formed by exposing a substrate to the air or an oxygen gas for a long time.

The light transmission layer in the present invention is composed of the organic-inorganic composite material formed from an organic polymer and a metallic compound. The thickness of the light transmission layer is preferably 4 to 500 µm, more preferably 5 µm to 50 µm.

When the organic-inorganic composite material is to be formed from an organic polymer and a metal alkoxide, the metal alkoxide is polycondensated through hydrolysis until the unreacted metal alkoxide is reduced to 3 vol. % or less, and then mixed with an organic-inorganic polymer to form an organic-inorganic composite material. An organic-inorganic composite material excellent in optical transparency can be thereby formed. The amount of the unreacted metal alkoxide can be measured by using gas chromatography etc. The reaction time in which the amount of the remaining metal alkoxide is reduced to 3 vol. % or less is previously determined by hydrolyzing the metal alkoxide under predetermined conditions of temperature, concentration etc., and for the determined reaction time, the metal alkoxide is hydrolyzed and polycondensated, and then mixed with an organic polymer to form an organic-inorganic composite material. Alternatively, the amount of the remaining metal alkoxide is measured while the metal alkoxide is hydrolyzed and polycondensated, and once the amount is reduced to 3 vol. % or less, the metal alkoxide may be mixed with an organic-inorganic polymer.

The content of the metal element in the organic-inorganic composite material is preferably 0.1 to 46 wt. %, more preferably 5 to 37 wt. %. The method of measuring the composition of the organic-inorganic composite material includes secondary ionization mass spectrometry (SIMS), X-ray photoelectron spectroscopy (XPS) and observation with an electron probe micro-analyzer (EPMA) or a transmission electron microscope (TEM).

The refractive index of the organic-inorganic composite material can be controlled by changing the amount of the metal element in the organic-inorganic composite material. For example, when the metal element is Si, the refractive index can be decreased by increasing the content of the metal element, while the refractive index can be increased by decreasing the content of the metal element.

When the metal element contained in the organic-inorganic composite material is Si, the metal oxide layer is preferably a silicon oxide layer. By using the same metal element in the organic-inorganic composite material and in the metal oxide layer, the adhesion between the metal oxide layer and the organic-inorganic composite material can be further improved.

DESCRIPTION OF THE PREFERRED EMBODIMENTS

Hereinafter, the present invention is described in more detail by reference to the Examples, which are not intended to limit the scope of the present invention.

[Preparation of a Metal Alkoxide Solution]

As the metal alkoxide, tetraethoxy silane (TEOS) was used. Tetraethoxy silane was mixed with a solvent, isopropyl alcohol (IPA) and 0.05 N hydrochloric acid in the ratio shown in Table 1, to prepare a metal alkoxide solution (solution A). In the solution A, the molar ratio of water to the metal alkoxide (water/TEOS) was 2.0.

TABLE 1

| Solution A | wt. % |
|---|---|
| TEOS | 39.6 |
| IPA | 53.6 |
| 0.05N HCl | 6.8 |

The solution A was kept at 26° C. in a beaker, and TEOS in the solution A was hydrolyzed and polycondensated under stirring. The solution A was sampled at predetermined intervals and analyzed by gas chromatography for determination of the amount of unreacted TEOS, i.e. the amount of remaining TEOS, in the solution A.

Figure 1:
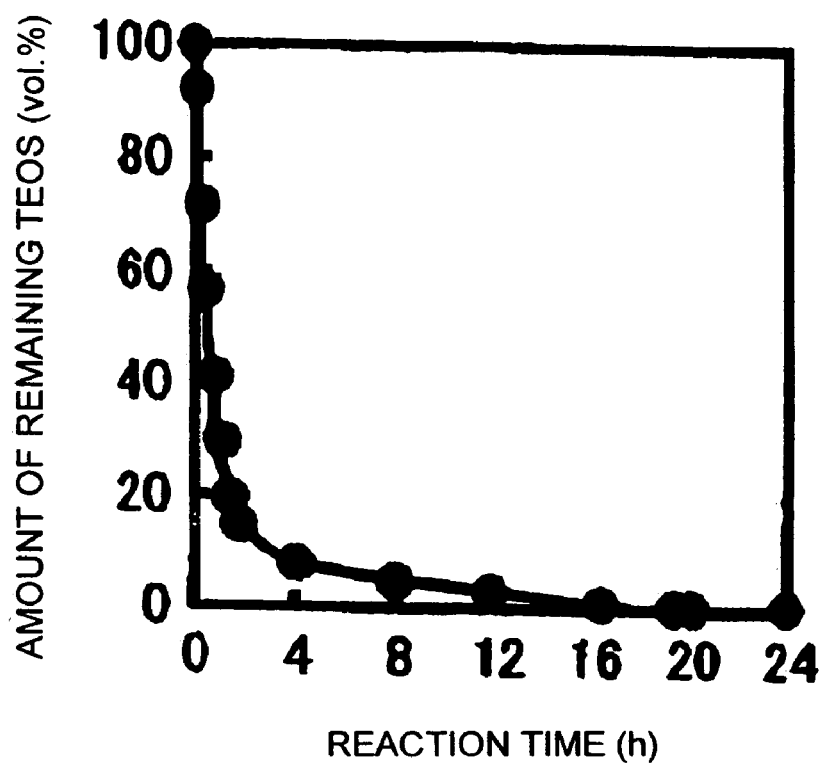
FIG. 1 is a graph showing the relationship between the reaction time for hydrolysis of metal alkoxide and the amount of remaining metal alkoxide.

FIG. 1 is a graph showing the relationship between the reaction time for hydrolysis and the amount of remaining TEOS. As can be seen from FIG. 1, the amount of remaining TEOS is decreased with the reaction time. As can be seen from the graph shown in FIG. 1, the amount of remaining TEOS is reduced to 3 vol. % or less when the reaction time is 12 hours or more.

[Preparation of an Organic Polymer Solution]

Polyvinylpyrrolidone (PVP) was used as the organic polymer. A solution of the organic polymer (solution B) was prepared by dissolving PVP in a solvent, IPA in the ratio shown in Table 2.

TABLE 2

| Solution B | wt. % |
|---|---|
| PVP | 17.5 |
| IPA | 82.5 |

[Evaluation of the Relationship between the Amount of Remaining TEOS in Solution A and Transmittance]

As shown in Table 3, each of solutions A allowed to react for predetermined time to reduce the amount of remaining TEOS to 1 vol. %, 3 vol. %, 5 vol. %, 10 vol. % and 20 vol. % respectively was mixed with solution B, whereby 5 types of coating solutions were prepared. 12.3 g of solution B was mixed with 37.7 g of solution A to give 50 g of coating solution.

Each of the resulting 5 types of coating solutions was applied by spin coating onto a quartz glass substrate of 1 mm in thickness and then dried for 1 hour in an electric oven at about 110° C., to form an organic-inorganic composite material film of 10 µm in thickness. This film on the substrate was irradiated with a light of wavelength of 630 nm in a direction perpendicular to the substrate, to determine its transmittance. The measurement results are shown in Table 3.

TABLE 3

| | Amount of Remaining TEOS in Solution A (vol. %) | | | | |
|---|---|---|---|---|---|
| | 1 | 3 | 5 | 10 | 20 |
| Reaction Time (hours) | 19 | 12 | 8 | 3 | 1.5 |
| Film Transmittance (%) | 97-95 | 95-90 | 85-80 | 80-70 | 80-70 |

It is evident from the results in Table 3 that when the amount of remaining TEOS in solution A is reduced to 3 vol. or less, high transmittance can be attained to give excellent optical transparency.

[Evaluation of the Relationship between the Amount of Remaining TEOS in Solution A and the Domain Size in the Film]

Solutions A wherein the amount of remaining TEOS had been reduced to 1 vol. %, 3 vol. %, 5 vol. %, 10 vol. %, 20 vol. % and 30 vol. % respectively by changing the reaction time were prepared in the same manner as above, and each solution A was then mixed with solution B to prepare 6 types of coating solutions. 12.3 g of solution B was mixed with 37.7 g of solution A to give 50 g of coating solution.

Figure 13:
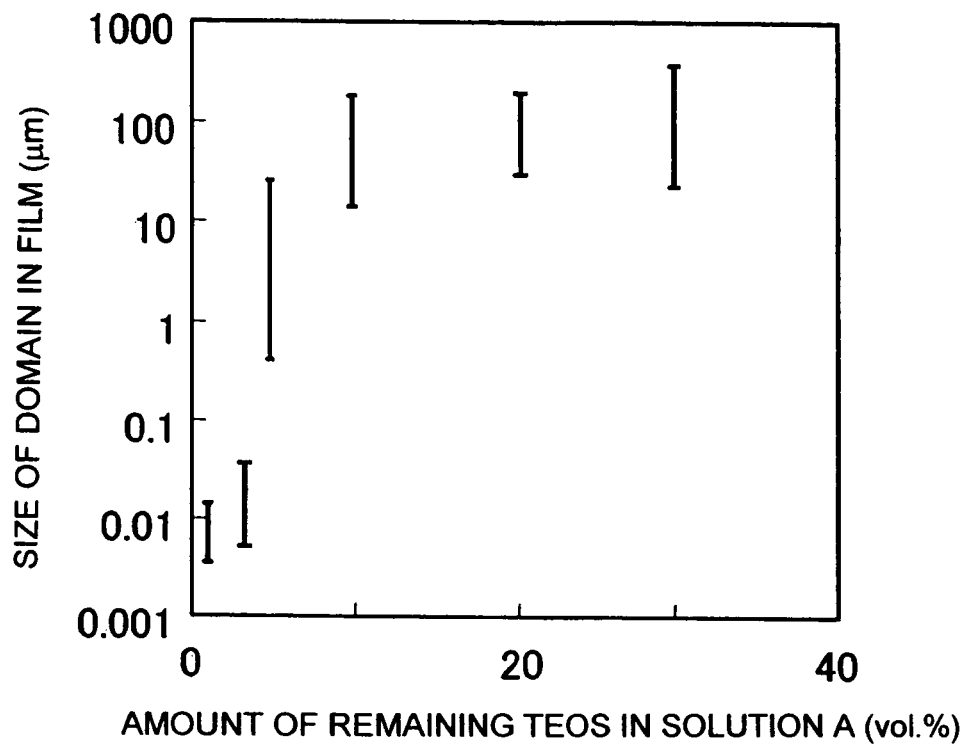
FIG. 13 is a graph showing the relationship between the amount of remaining TEOS in solution A and the domain size of a film.

Each of the resulting 6 types of coating solutions was applied by spin coating in the same manner as above onto a quartz glass substrate, to form a film of the organic-inorganic composite material on the substrate. Each film was measured for the domain size in the film. The domain is formed from the organic or inorganic region. The domain size in the film made of the solution A wherein the amount of remaining TEOS was 1 or 3 vol. % was measured by observation under an electron microscope due to its smaller domain size. The domain size in the film made of the solution A wherein the amount of remaining TEOS was 5, 10, 20 or 30 vol. % was measured by observation under an optical microscope due to its larger domain size. FIG. 13 is a graph showing the relationship between the amount of remaining TEOS in solution A and the domain size in the film. Because there is a profile of the domain size in the film, FIG. 13 shows a line drawn between the minimum value and maximum value.

As is evident from FIG. 13, the domain size can be reduced to 0.1 µm or less by reducing the amount of remaining TEOS in solution A to 3 vol. % or less. Accordingly, the domain size can be reduced so as not to interfere with transmission of lights of wavelengths in the range of 400 to 1600 nm that can be used in optical communication.

[Evaluation of the Relationship between the Amount of Remaining TEOS in Solution A and the Area of the Film Released]

Solutions A wherein the amount of remaining TEOS was reduced to 1 vol. %, 3 vol. %, 5 vol. %, 10 vol. %, 20 vol. % and 30 vol. % respectively by changing the reaction time were prepared in the same manner as described above, and the respective solutions A were used in the same manner as above to prepare 6 types of coating solutions.

Each coating solution was applied in the same manner as described above onto a glass substrate of 2.5 cm in length and width, to form an organic-inorganic composite material film of 10 µm in thickness. After each film was left for 10 days, the region of the film released from the substrate was measured. The measurement results are shown in FIG. 14.

Figure 14:
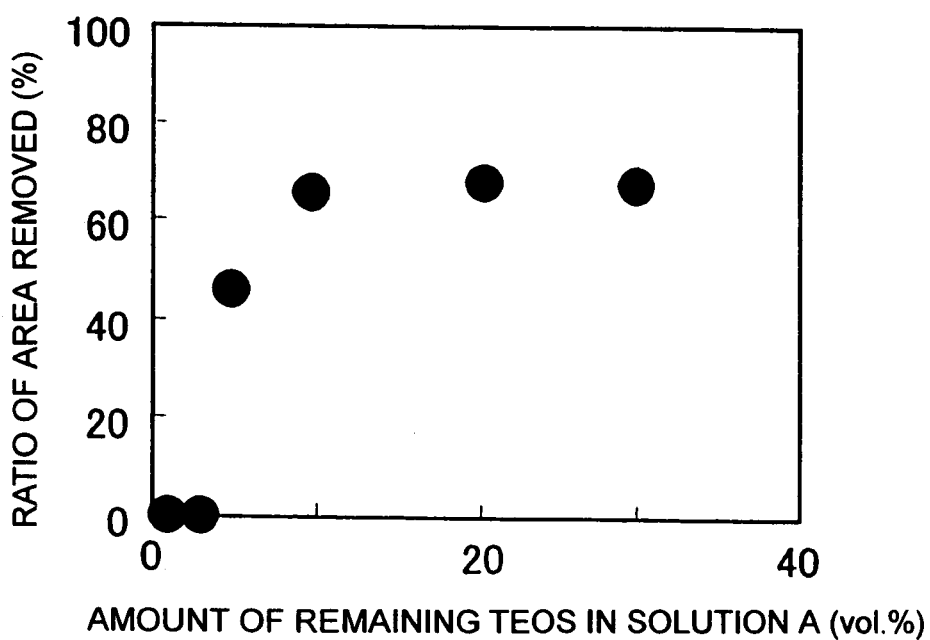
FIG. 14 is a graph showing the relationship between the amount of remaining TEOS in solution A and the area of a film removed.

It is evident from FIG. 14 that good adhesion of the film to the substrate can be achieved by reducing the amount of remaining TEOS in solution A to 3 vol. % or less.

[Preparation of Solution C, Solution D and a Mixed Coating Solution thereof]

A solvent, acetone and 0.05 N aqueous hydrochloric acid were mixed with TEOS in the ratio shown in Table 4, to prepare solution C.

TABLE 4

| Solution C | wt. % |
|---|---|
| TEOS | 39.6 |
| Acetone | 53.6 |
| 0.05N HCl | 6.8 |

As the organic polymer, polymethylmethacrylate (PMMA) was mixed with a solvent, acetone in the ratio shown in Table 5, to prepare solution D.

TABLE 5

| Solution D | wt. % |
|---|---|
| PMMA | 17.5 |
| Acetone | 82.5 |

The solution D was mixed with the solution C wherein the amount of remaining TEOS was 3 vol. %, to prepare a mixed coating solution. In this preparation, 5.4 g of solution D was mixed with 16.6 g of solution C. This mixed coating solution was applied in the same manner as described above onto a quartz glass substrate, to form a film of 10 μm in thickness thereon, and the resulting film was examined for transmittance of light of a wavelength of 630 nm, to indicate 95 to 90% transmittance.

[Preparation of Solution E, Solution F and a Mixed Coating Solution thereof]

As the metal alkoxide, phenyltriethoxy silane was used. Phenyltriethoxy silane was mixed with a solvent, N-methyl-2-pyrrolidone (NMP) and 0.05 N aqueous hydrochloric acid in the ratio shown in Table 6, to prepare solution E.

TABLE 6

| Solution E | wt. % |
|---|---|
| Phenyltriethoxy Silane | 39.6 |
| NMP | 53.6 |
| 0.05N HCl | 6.8 |

PMMA was mixed with a solvent NFP in the ratio shown in Table 7, to prepare solution F.

TABLE 7

| Solution F | wt. % |
|---|---|
| PMMA | 17.5 |
| NMP | 82.5 |

The solution F was mixed with the solution E wherein the amount of remaining phenyltriethoxy silane was 3 vol. %, to prepare a mixed coating solution. In this preparation, 4.4 g of solution F was mixed with 15.6 g of solution E.

This mixed coating solution was applied in the same manner as described above onto a quartz glass substrate, to form an organic-inorganic composite material film of 10 μm in thickness, and then the film was irradiated with a light of a wavelength of 630 nm to determine its transmission. The transmittance was 95 to 90%.

[Preparation of Coating Solutions Different in Si Content and Measurement of the Refractive Index of an Organic-Inorganic Composite Material Film]

The solution A was mixed with the solution B in the ratio shown in Table 8, to prepare coating solutions 1 to 5 different in Si content. The used solution A was the one wherein the amount of remaining TEOS was reduced to 1 vol. % by hydrolysis and polycondensation.

TABLE 8

| Coating Solution | Solution A (g) | Solution B (g) | Content of Si in Organic-Inorganic Composite Material (wt. %) |
|---|---|---|---|
| 1 | 43 | 7 | 37 |
| 2 | 38 | 12 | 31 |
| 3 | 30 | 20 | 23 |
| 4 | 22 | 28 | 16 |
| 5 | 7 | 43 | 5 |

Each of the coating solutions 1 to 5 was applied onto a glass substrate in the same manner as described above, to an organic-inorganic composite material film of 2 μm in thickness. The refractive index of the formed film was measured.

Figure 2:
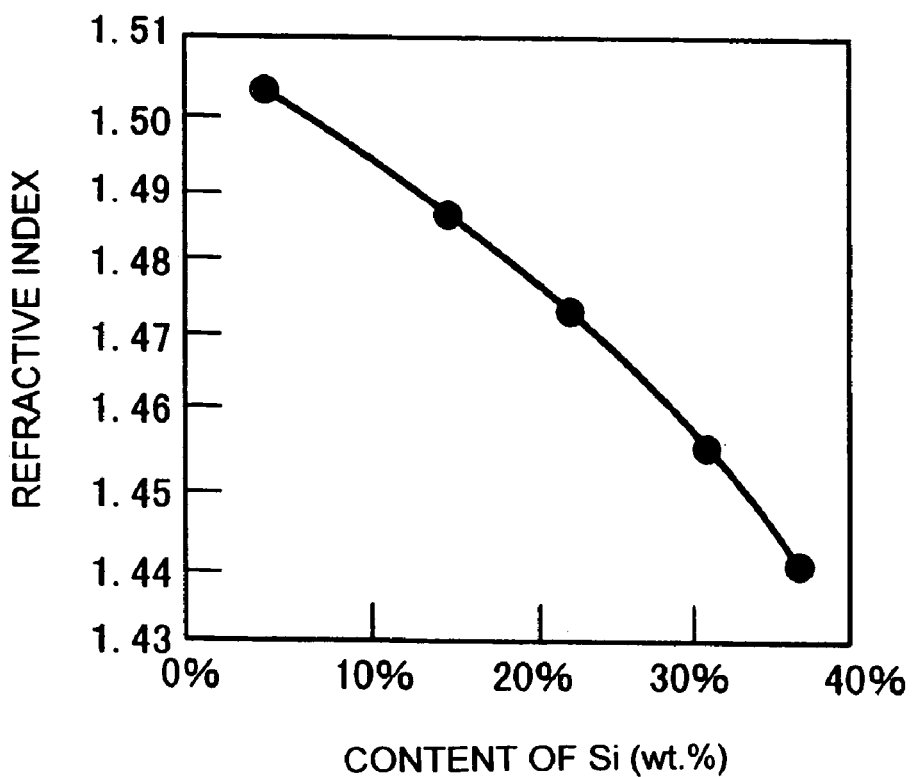
FIG. 2 is a graph showing the content of Si and refractive index in the organic-inorganic composite material of the present invention.

FIG. 2 is a graph showing the refractive index of a film formed from each of the coating solutions 1 to 5. FIG. 2 shows the relationship between Si content and refractive index in the organic-inorganic composite material.

As can be seen from FIG. 2, the refractive index is decreased as the Si content is increased.

Hereinafter, the laminate in the first aspect of the present invention is described by reference to the Example.

Figure 3:
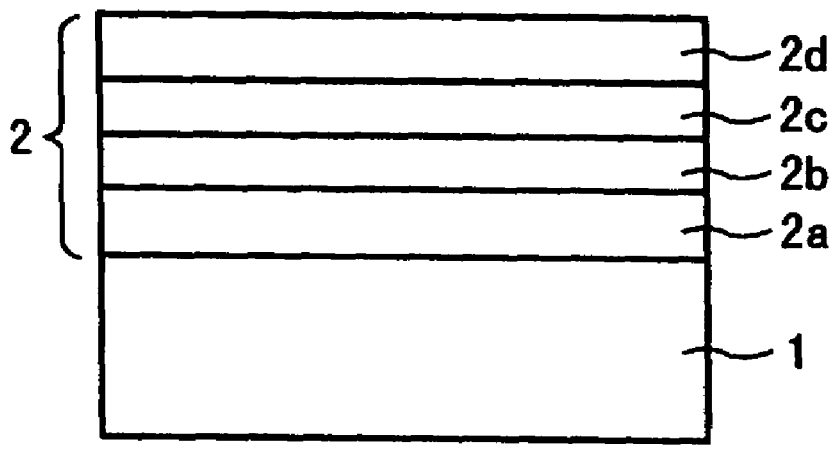
FIG. 3 is a schematic sectional drawing showing an example of the laminate in accordance with the first aspect of the present invention.

FIG. 3 is a schematic sectional drawing showing one example of the laminate in accordance with the first aspect of the present invention. Referring to FIG. 3, films 2a, 2b, 2c and 2d made of the organic-inorganic composite material are laminated on substrate 1. Laminate 2 is composed of films 2a to 2d. In the films 2a, 2b, 2c, and 2d, the metal element is increased or decreased in the order of the films. For example, when alkoxy silane is used as the metal alkoxide, films 2a to 2d are formed such that the Si content is gradually increased or decreased in the order of films 2a to 2d. Accordingly, the laminate 2 has a concentration gradation of increasing or decreasing Si concentration from the substrate 1 to the surface of the laminate 2.

As described by reference to FIG. 2, the refractive index of the film is decreased as the Si content is increased. Accordingly, when the laminate 2 has a concentration gradation of an increasing Si content from the substrate 1 to the surface of the laminate 2, there is formed a graded structure wherein the refractive index is decreased from the substrate 1 to the surface of the laminate 2. On the other hand, when the laminate 2 has a concentration gradation of a decreasing content of Si from the substrate 1 to the surface of the laminate 2, there is formed a graded structure wherein the refractive index is increased from the substrate 1 to the surface of the laminate 2.

EXAMPLE 1

The coating solutions 5, 4, 3, 2 and 1 described above were applied in this order onto a quartz glass substrate, to form a laminate wherein 5 layers (films) made of the respective organic-inorganic composite materials were laminated. Each coating solution was applied by spin coating. It was predetermined for the thickness of each layer to be 2 μm after drying. The thickness of each layer was controlled by the number of revolutions of the substrate in the step of spin coating. Each coating solution was applied and then dried for 1 hour in an electric oven at about 110° C. Because 5 layers i.e. films were laminated, the test specimen was dried 5 times in total in the electric oven.

Figure 4:
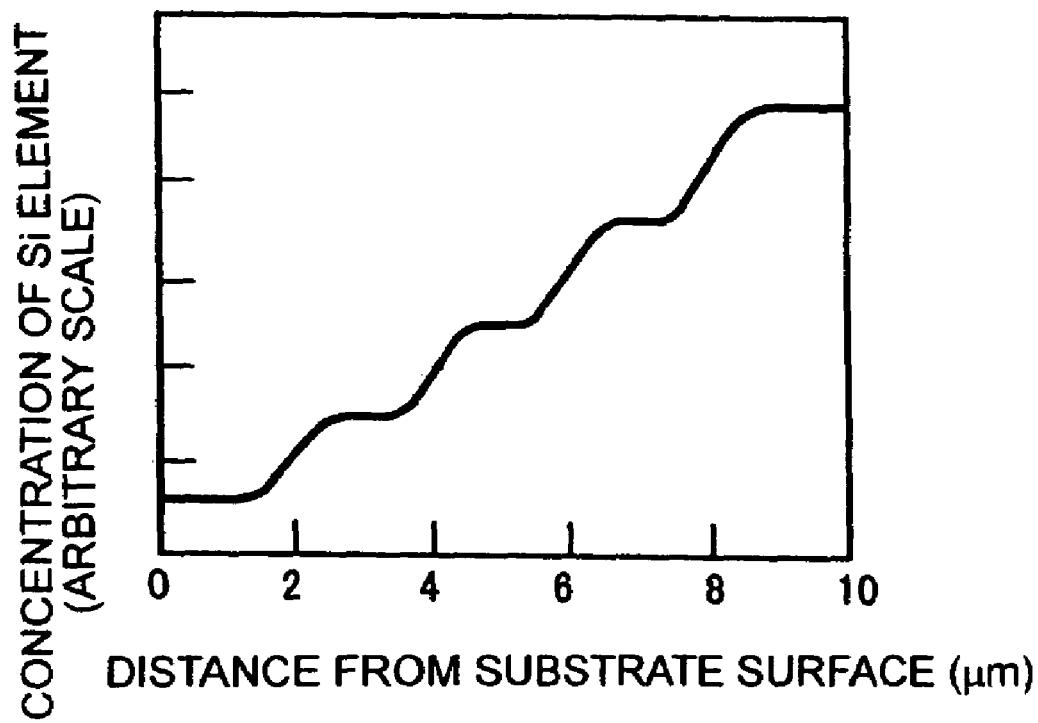
FIG. 4 is a graph showing the profile of concentration of Si element in the laminate in accordance with the first aspect of the present invention.

FIG. 4 is a graph showing the profile of concentration of Si element in the laminate formed in the manner described above. The concentration of Si element was measured by secondary ionization mass spectrometry (SIMS). In FIG. 4, the distance from the surface of the substrate is shown in the abscissa. It is evident from FIG. 4 that the concentration of Si element in the laminate in Example 1 is increased from the substrate to the surface of the laminate.

No cracking occurred on the surface of the laminate in Example 1. For comparison, only the coating solution 3 was applied on a quartz glass substrate to form a film of 10 μm in thickness after drying. Cracking occurred on the surface of this comparative film. In the laminate in Example 1, there is a concentration gradation wherein the concentration of Si element is increased towards the surface, and this concentration gradation would relieve the stress upon formation of the laminate, thus preventing cracking on the surface. Accordingly, the adhesion to the substrate would also be improved by giving such concentration gradation to the laminate.

EXAMPLE 2

The coating solutions 5, 4, 3, 2 and 1 were applied in this order onto a quartz glass substrate (refractive index: 1.46) in the same manner as in Example 1, to form a laminate. In Example 2, however, the respective layers were formed so as to be 20, 10, 5, 3 and 22 μm in thickness, respectively.

Figure 5:
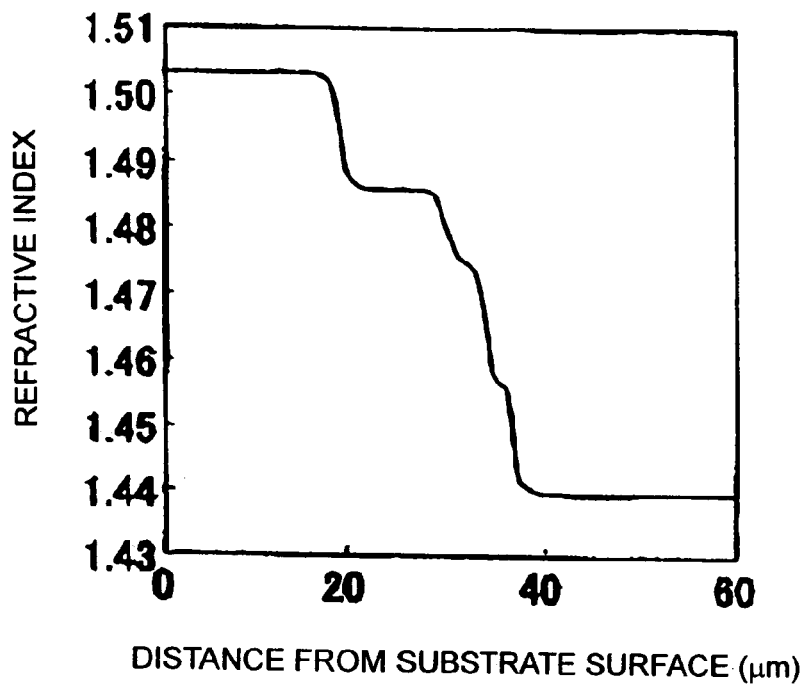
FIG. 5 is a graph showing the profile of refractive index of the laminate in accordance with the first aspect of the present invention.

FIG. 5 is a graph showing the profile, in the direction of thickness, of the refractive index of the laminate in Example 2.

As shown in FIG. 5, this laminate is provided with a graded structure wherein the refractive index is gradually decreased from the substrate to the surface of the laminate.

Figure 6:
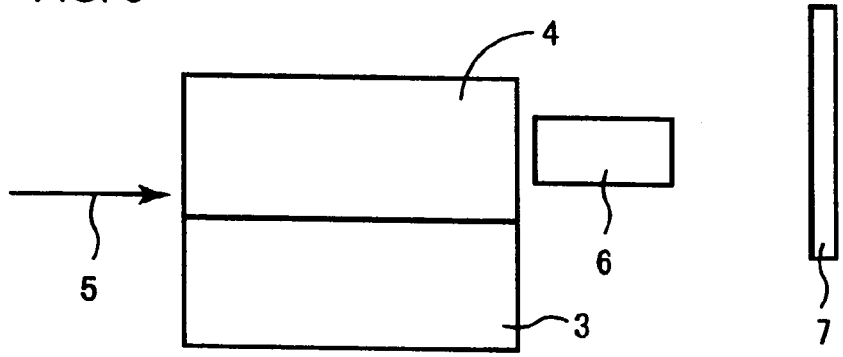
FIG. 6 is an illustration of a device in a test for confirmation of an optical waveguide of the laminate in accordance with the first aspect of the present invention.

As shown in FIG. 6, this laminate was used as a graded index-type planar optical waveguide. Referring to FIG. 6, laminate 4 is arranged on a quartz glass substrate 3. Laminate 4 is the laminate in Example 2. Laser light 5 was introduced into the end surface of a layer of low refractive index in laminate 4 near to the substrate 3. In the vicinity of the end surface of laminate 4 at the side opposite to the end surface where laser light 5 was introduced, an optical system 6 was arranged, and screen 7 was arranged apart by a predetermined distance from the optical system 6. The laser light 5 introduced into one end surface of laminate 4 was passed through the optical system 6 and projected on the screen 7. A sharp spot of light was projected on the screen 7, indicating that the laminate in Example 2 can function as a planar optical waveguide.

Hereinafter, the laminates in the second and third aspects of the present invention are described by reference to the Examples.

Figure 7:
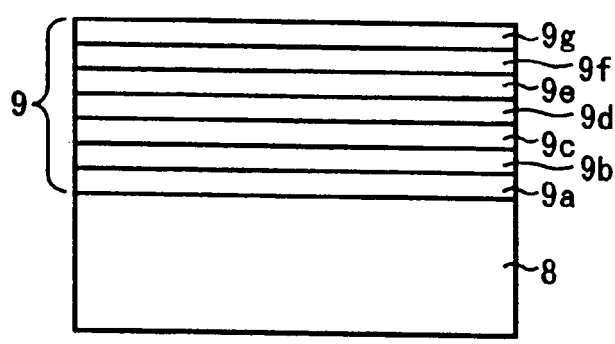
FIG. 7. is a schematic sectional drawing showing an example of the laminate in accordance with the second aspect of the present invention.

FIG. 7 is a schematic sectional drawing of the laminate in the second aspect of the present invention. Referring to FIG. 7, laminate 9 was formed by laminating the organic-inorganic composite material films 9a, 9b, 9c, 9d, 9e, 9f, and 9g on substrate 8. Among films 9a to 9g, film 9d had the highest content of the metal element. The content of the metal element of the metal alkoxide is increased in the order of films 9a, 9b, 9c and 9d, but the content of the metal element is decreased in the order of films 9d, 9e, 9f and 9g. Accordingly, the laminate 9 has a concentration gradation wherein the metal element of the metal alkoxide is first increased and then decreased. As described above, the refractive index is decreased as the content of Si is increased, so a graded structure wherein the refractive index is first decreased and then increased in the direction of thickness is formed in the laminate 9.

Figure 8:
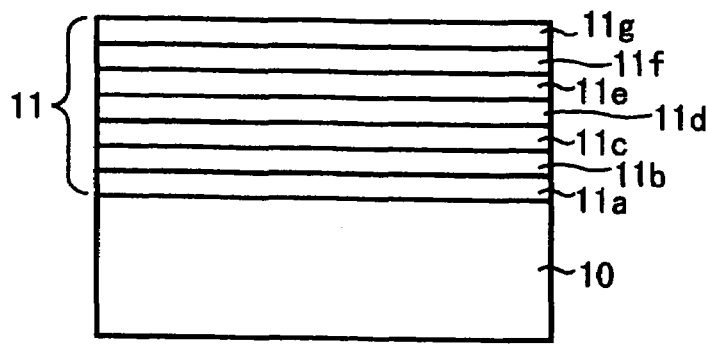
FIG. 8 is a schematic sectional drawing showing an example of the laminate in accordance with the third aspect of the present invention.

FIG. 8 is a schematic sectional drawing showing an example of the laminate in accordance with the third aspect of the present invention. Referring to FIG. 8, the organic-inorganic composite material films 11a, 11b, 11c, 11d, 11e, 11f and 11g are laminated in this order on substrate 10. The laminate 11 is composed of films 11a to 11g. In the laminate 11, the film 11d is formed so as to have the lowest concentration of the metal element. The concentration of the metal element is decreased in the order of films 11a, 11b, 11c and 11d, and the concentration of the metal element is increased in the order of films 11d, 11e, 11f and 11g. Accordingly, the concentration gradation wherein the metal element in the metal alkoxide is first decreased and then increased in the direction of thickness is formed in the laminate 11. As described above, the refractive index is decreased as the content of Si is increased. Accordingly, a graded structure wherein the refractive index is first increased and then decreased in the direction of thickness is formed in the laminate 11.

EXAMPLE 3

The coating solutions 5, 4, 3, 2, 1, 2, 3, 4 and 5 were applied in this order onto a quartz glass substrate, to laminate thin films on the substrate. Each coating solution was applied and dried in the same manner as in Example 1. It was predetermined for the thickness of each layer to be 2 μm after drying. A laminate was formed by laminating 9 films in total.

Figure 9:
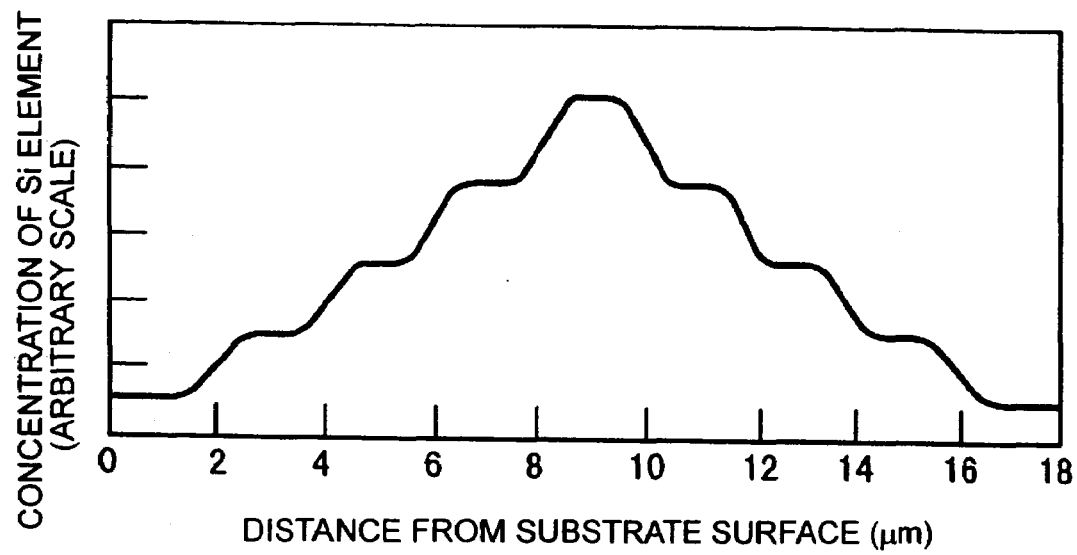
FIG. 9 is a graph showing the profile of concentration of Si element in the laminate in accordance with the second aspect of the present invention.

FIG. 9 is a graph showing the profile of concentration of Si element in the direction of thickness in the laminate, as determined by SIMS. As shown in FIG. 9, the concentration of Si element is highest in the middle of the laminate, and the concentration of Si element is first increased and then decreased in the direction of thickness in the laminate. Accordingly, the refractive index is first decreased and then increased in the direction of thickness.

As shown in FIG. 9, those regions of about 1 μm in thickness wherein the concentration of Si element is almost constant have been formed apart by 1, 3, 5, 7, 9, 11, 13, 15, and 17 μm respectively from the surface of the substrate. Among these regions, there are regions where the Si element is continuously changed. These regions would be formed by diffusion of the Si element into the boundaries of the respective layers.

EXAMPLE 4

A laminate was formed in the same manner as in Example 3 except that each solution was applied to form a film of 0.5 μm in thickness after drying. Because 9 films each having a thickness of 0.5 μm after drying are laminated, the thickness of the laminate is 4.5 μm.

Figure 10:
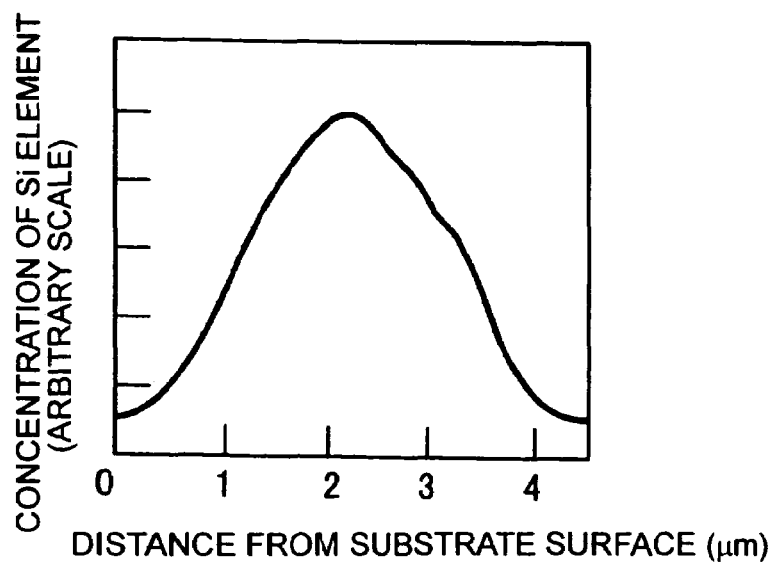
FIG. 10 is a graph showing the profile of concentration of Si element in the laminate in accordance with the second aspect of the present invention.

FIG. 10 is a graph showing the profile of concentration of Si element in the laminate, as determined by SIMS. As shown in FIG. 10, each layer in this laminate is so thin that the concentration of Si element is continuously changed. The concentration of Si element is highest in the middle of the laminate, similar to the laminate in Example 3, and a concentration gradation wherein the concentration of Si element is first increased and then decreased in the direction of thickness is formed in the laminate. Accordingly, a graded structure wherein the refractive index is first decreased and then increased in the direction of thickness is formed in the laminate.

For comparison, only the coating solution 3 was applied to form an organic-inorganic composite material film of 4.5

μm in thickness after drying. A large number of cracks were recognized on the surface of the film thus obtained. On the other hand, no cracking was recognized on the surfaces of the laminates in Examples 3 and 4. In the laminates in Examples 3 and 4, there is a concentration gradation of Si element, and this concentration gradation would relieve the stress upon formation of the thin film, thus preventing cracking on the surface.

EXAMPLE 5

A quartz glass substrate (refractive index: 1.46) was coated with the coating solutions 1, 2, 3, 4, 5, 4, 3, 2 and 1 in this order, to form a laminate having organic-inorganic composite material films laminated therein. The respective coating solutions were applied so as to form films of 22, 3, 5, 10, 20, 10, 5, 3, and 22 μm in thickness respectively after drying. Each coating solution was applied and dried in the same manner as in Example 1.

Figure 11:
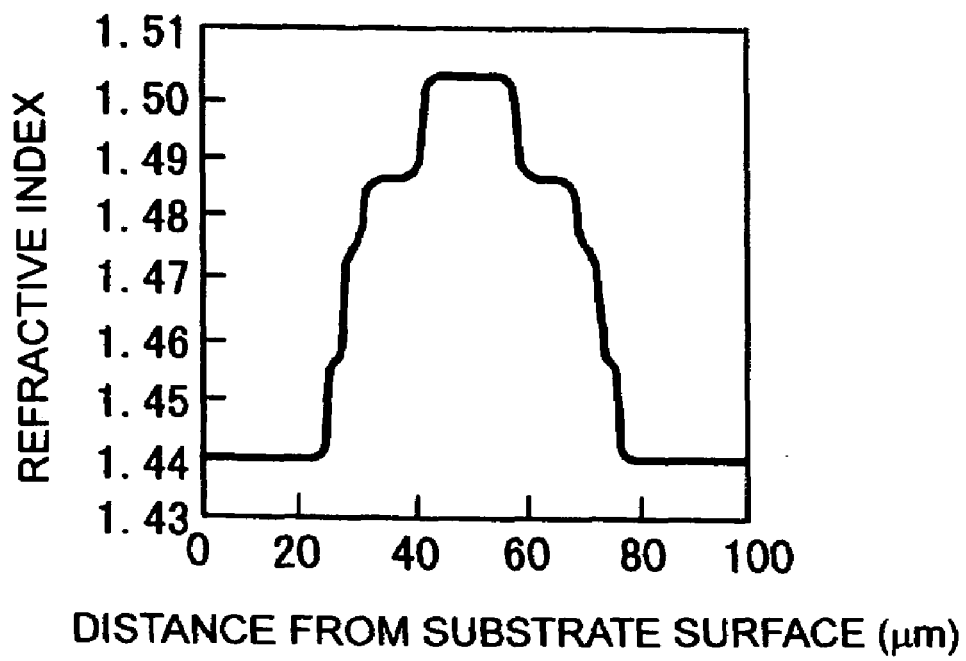
FIG. 11 is a graph showing the profile of refractive index of the laminate in accordance with the third aspect of the present invention.

FIG. 11 is a graph showing the profile, in the direction of thickness, of the refractive index of the resulting laminate. As shown in FIG. 11, the refractive index is highest in the middle of the laminate, and a graded structure wherein the refractive index is first increased and then decreased in the direction of thickness is formed in the laminate.

Figure 12:
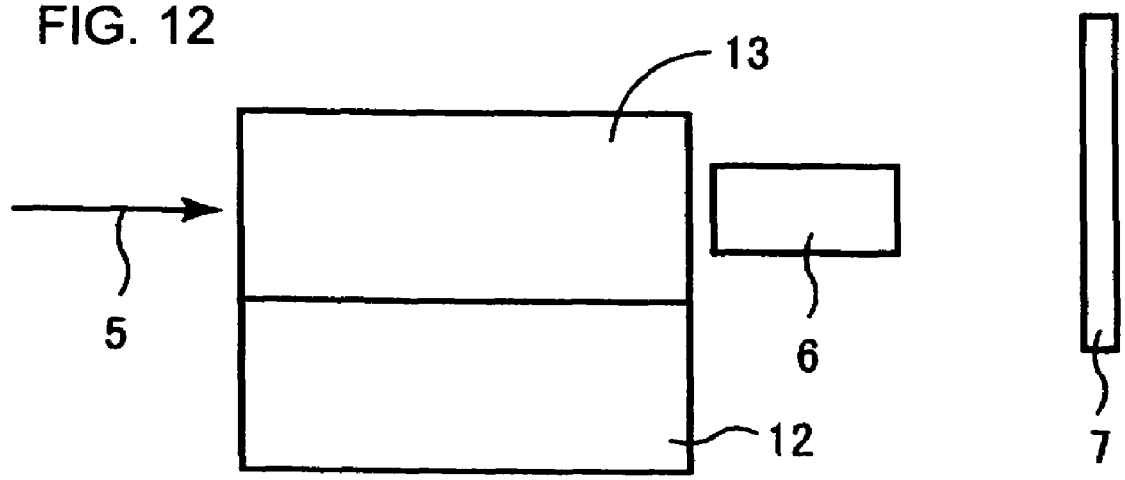
FIG. 12 is an illustration of a device in a test for confirmation of an optical waveguide of the laminate in accordance with the third aspect of the present invention.

The functions of the laminate in Example 5 as an optical waveguide were confirmed in the same manner as in Example 2. FIG. 12 is an illustration therefor. As shown in FIG. 12, laminate 13 is formed on substrate 12. As shown in FIG. 11, a layer of high refractive index is formed in the middle of laminate 13. Laser light 5 was introduced into the edge of the layer of high refractive index in the same manner as in Example 2. As a result, a sharp spot of light was observed on screen 7. Accordingly, the laminate in this example was also confirmed to function as a planar optical waveguide.

In the Examples above, the profile of concentration of Si element in the laminate was measured by secondary ionization mass spectrometry (SIMS), but the gradation of concentration can also be determined by observation of a section by X-ray photoelectron spectroscopy (XPS) or with an electron probe micro-analyzer (EPMA) or a transmission electron microscope (TEM).

The organic-inorganic composite material and the laminate thereof according to the present invention can be used not only as a material for optical components but also as a material for various electronic components, a material for mechanical components, a material for various coatings, and a material for insulating films.

According to the production method of the present invention, an organic-inorganic composite material excellent in optical transparency can be produced. Further, the organic-inorganic composite material of the present invention and its laminate are excellent in optical transparency and useful as a material for optical components such as optical waveguides and optical fibers. Further, it can also be used as a material for various electronic components, a material for mechanical components, a material for various coatings, and a material for insulating films.

Hereinafter, the light transmission structure of the present invention is described by reference to the Examples, but the light transmission structure of the present invention is not limited by the Examples below.

Figure 15:
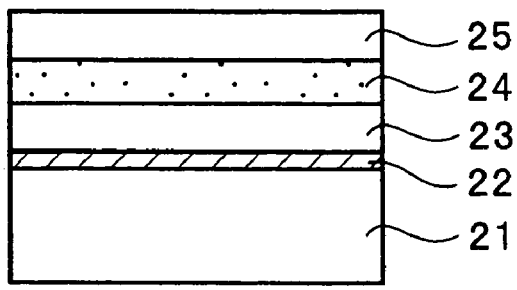
FIG. 15 is a schematic sectional drawing showing an example of the light transmission structure in accordance with the present invention.

FIG. 15 is a schematic sectional drawing showing an example of the light transmission structure of the present invention. A metal oxide layer 22 is arranged on substrate 21. A clad layer 23 composed of an organic-inorganic composite material is formed on the metal oxide layer 22, and a light transmission layer 24 composed of an organic-inorganic composite material is formed thereon. A clad layer 25 composed of an organic-inorganic composite material is arranged on the light transmission layer 24. The clad layer 23, the light transmission layer 24 and the clad layer 25 are formed from an organic-inorganic composite material but constituted such that the refractive index of light transmission layer 24 is made relatively high, while the refractive index of clad layers 23 and 25 is made relatively low.

Figure 16:
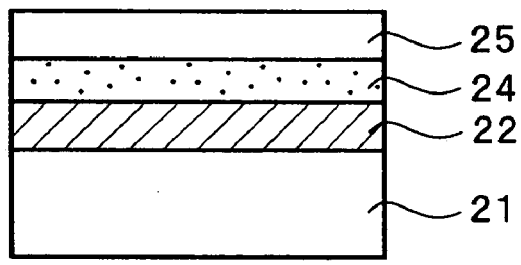
FIG. 16 is a schematic sectional drawing showing another example of the light transmission structure in accordance with the present invention.

FIG. 16 is a sectional drawing showing another example of the light transmission structure of the present invention. In this example, a metal oxide layer 22 is arranged on substrate 21, and a light transmission layer 24 composed of an organic-inorganic composite material is arranged on the metal oxide layer 22. A clad layer 25 made of an organic-inorganic composite material is arranged on the light transmission layer 24. In this example, the metal oxide layer 22 is used as a clad layer.

Figure 17:
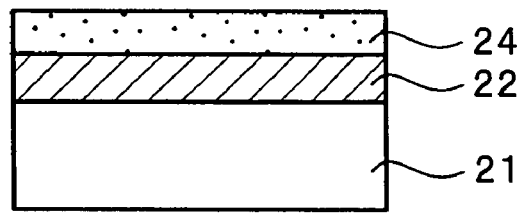
FIG. 17 is a schematic sectional drawing showing a still other example of the light transmission structure in accordance with the present invention.

FIG. 17 is a sectional view showing a still other example of the light transmission structure of the present invention. In this example, a metal oxide layer 22 is formed on substrate 21, and a light transmission layer 24 made of an organic-inorganic composite material is arranged on the metal oxide layer 22. In this example too, the metal oxide layer 22 is used as a clad layer.

In the examples shown in FIGS. 16 and 17, the metal oxide layer 22 is used as a clad layer. When a silicon substrate (refractive index: 3.5) is used as substrate 21 and a $SiO_2$ layer (refractive index: 1.45) is used as metal oxide layer 22, the thickness of the metal oxide layer 22 is preferably 2 μm or more in order to reduce the influence of the very high refractive index of the silicon substrate on the optical waveguide.

(Formation of a Metal Oxide Layer)

As the substrate, a silicon substrate was used. Specifically, a single-crystal Si wafer was used. A silicon oxide was formed as a metal oxide layer on the substrate by RF magnetron sputtering. Specifically, the substrate was arranged in a substrate holder in a vacuum chamber of an RF magnetron sputtering apparatus, and Ar and oxygen gases were introduced as sputtering gas into the vacuum chamber. In this step, it was predetermined that the partial pressures of Ar and oxygen were $1 \times 10^{-2}$ and $3.5 \times 10^{-3}$ Torr, respectively. By applying high-frequency power (13.56 MHz, 200 W) to the Si target, sputtered Si particles were reacted with oxygen atoms to form a silicon oxide layer of 100 nm in thickness on the substrate.

(Preparation of a Metal Alkoxide Solution)

As the metal alkoxide, tetraethoxy silane (TEOS) was used. Tetraethoxy silane was mixed with a solvent isopropyl alcohol (IPA) and 0.05 N hydrochloric acid such that the weight ratio of TEOS:IPA:HCl (0.05 N) was 39.6:53.6:6.8, to prepare a metal alkoxide solution (solution A).

(Preparation of an Organic Polymer Solution) Polyvinylpyrrolidone (PVP) was used as the organic polymer and mixed in an amount of 17.5 wt. % in IPA as the solvent, to give an organic polymer solution (solution B).

(Preparation of a Coating Solution for Formation of an Organic-Inorganic Composite Material)

The solution A was hydrolyzed and polycondensated until the amount of remaining TEOS was reduced to 1 vol. %, and then the solution B was mixed therewith. The amount of remaining TEOS was determined by gas chromatography.

20 g of solution B was mixed with 30 g of solution A, to prepare a coating solution 1. Separately, 43 g of solution B was mixed with 7 g of solution A, to prepare a coating solution 2. The Si content in an organic-inorganic composite material formed from the coating solution 1 was 23 wt. %, while the Si content in an organic-inorganic composite material formed from the coating solution 2 was 5 wt. %.

Each of the coating solutions 1 and 2 was applied onto a glass substrate and then dried for 1 hour in an electric oven at about 110° C., to form an organic-inorganic composite material film of 2 μm in thickness. Measurement of the refractive index of the formed film indicated that the refractive index of the film formed from the coating solution 1 was about 1.47, and the refractive index of the film formed from the coating solution 2 was about 1.50.

EXAMPLE 6

A silicon substrate having a silicon oxide layer formed thereon was coated by spin coating with the coating solution 1, and then dried for 1 hour in an electric oven at about 110° C., to form an organic-inorganic composite material film of 5 μm in thickness thereon. This film was a layer of low refractive index, to serve as a clad layer. Then, the coating solution 2 was applied by spin coating thereon, and dried for 1 hour in an electric oven at about 110° C., to form an organic-inorganic composite material film of 10 μm in thickness. This film was a layer of high refractive index, to serve as a light transmission layer.

COMPARATIVE EXAMPLE 1

For comparison, the coating solutions 1 and 2 were used in the same manner as in Example 6 on a silicon substrate not forming a silicon oxide layer thereon, to form a clad layer and a light transmission layer, each of which was composed of an organic-inorganic composite material.

(Evaluation of Adhesion)

40 Samples in each of Example 6 and Comparative Example 1 were prepared, and the surfaces of these samples were observed under an optical microscope. As a result, film release was observed in 7 samples in Example 6, while film release was observed in 28 samples in Comparative Example 1. This is possibly because in Example 6, the presence of the silicon oxide layer improves the adhesion of the light transmission layer to the substrate. According to the present invention, therefore, the light transmission layer composed of the organic-inorganic composite material can be formed with good adhesion to the substrate.

(Evaluation thereof as an Optical Waveguide)

Figure 18:
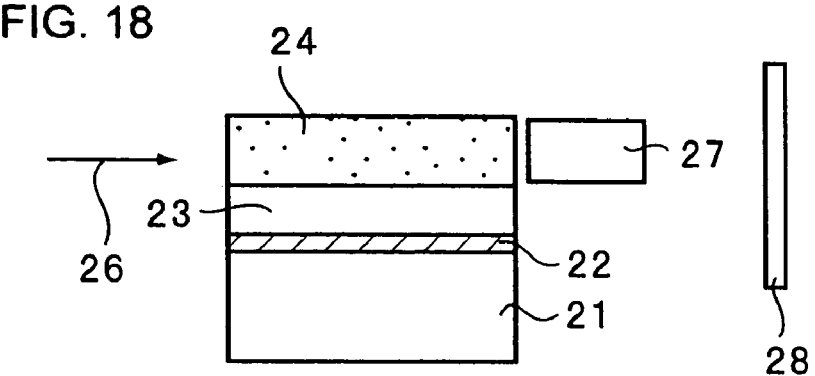
FIG. 18 is an illustration of a device in a test for confirmation of an optical waveguide.

The sample in Example 6 was evaluated for its functions as an optical waveguide. FIG. 18 is an illustration therefor. In the sample in Example 6 as shown in FIG. 18, a silicon oxide layer 22 is formed on substrate 21, and a clad layer 23 made of an organic-inorganic composite material and a light transmission layer 24 made of an organic-inorganic composite material are formed thereon. Laser light 26 was introduced into the end surface of the light transmission layer 24. In the vicinity of the end surface of the light transmission layer 24 at the side opposite to the end surface where laser light 26 was introduced, an optical system 27 was arranged, and screen 28 was arranged apart by a predetermined distance from the optical system 27. The laser light 26 introduced into one end surface of the light transmission layer 24 was passed through the optical system 27 and projected on the screen 28. A sharp spot of light was projected on the screen 28, indicating that the sample in Example 6 can function as a planar optical waveguide.

In the Example described above, polyvinylpyrrolidone was used as the organic polymer, but it was confirmed that the same effect can also be obtained by using polycarbonate or polymethyl methacrylate as the organic polymer.

In the Example described above, tetraethoxy silane was used as metal alkoxide, but it was confirmed that the same effect can also be obtained by using phenyltriethoxy silane.

According to the present invention, in a light transmission structure provided on a metallic substrate with a light transmission layer made of an organic-inorganic composite material, the adhesion of the light transmission layer to the substrate can be improved. Accordingly, the light transmission structure of the present invention is useful for optical components such as optical waveguides, light-guide plates for liquid crystal displays, etc. Further, the light transmission structure of the present invention is useful as a structure for electronic components and a structure for mechanical components other than optical components.

What is claimed is:

1. A multi-layer laminate comprising a plurality of successively stacked layers of respective organic-inorganic composite materials, wherein:
    each of said organic-inorganic composite materials is respectively produced by polycondensating a metal alkoxide of a metal element through hydrolysis until a remaining unreacted amount of said metal alkoxide is reduced to no more than 3 vol. %, and then mixing an organic polymer with at least said metal alkoxide that has been polycondensated;
    said layers respectively have different concentrations of said metal element in said respective organic-inorganic composite material, such that said laminate has a concentration gradient with a varying concentration of said metal element through a thickness of said laminate from a first side to a second side of said laminate.

2. The multi-layer laminate according to claim 1, wherein said laminate has a refractive index gradient with a varying refractive index through said thickness of said laminate.

3. The multi-layer laminate according to claim 2, wherein said refractive index varies opposite said concentration.

4. The multi-layer laminate according to claim 3, wherein said concentration of said metal element increases monotonously through said thickness from said first side to said second side, and said refractive index decreases monotonously from said first side to said second side.

5. The multi-layer laminate according to claim 3, wherein said concentration of said metal element first increases and then decreases in succession through said thickness from said first side to said second side, and said refractive index first decreases and then increases in succession through said thickness from said first side to said second side.

6. The multi-layer laminate according to claim 3, wherein said concentration of said metal element first decreases and then increases in succession through said thickness from said first side to said second side, and said refractive index first increases and then decreases in succession through said thickness from said first side to said second side.

7. The multi-layer laminate according to claim 1, wherein said concentration of said metal element increases monotonously through said thickness from said first side to said second side.

8. The multi-layer laminate according to claim 1, wherein said concentration of said metal element first increases and then decreases in succession through said thickness from said first side to said second side.

9. The multi-layer laminate according to claim 1, wherein said concentration of said metal element first decreases and then increases in succession through said thickness from said first side to said second side.

10. The multi-layer laminate according to claim 1, wherein said metal alkoxide is one of Si alkoxide, Ti alkoxide, and Zr alkoxide.

11. The multi-layer laminate according to claim 1, wherein said organic-inorganic composite materials respectively have an optical transmittance of at least 90% per 10 μm thickness of said organic-inorganic materials for light having a wavelength of 600 to 1000 nm.

12. The multi-layer laminate according to claim 1, wherein said organic-inorganic composite materials respectively have an overall content of said metal element in a range from 0.1 to 46 wt. %.

13. The multi-layer laminate according to claim 12, wherein said overall content of said metal element is in a range from 5 to 37 wt. %.

14. The multi-layer laminate according to claim 1, wherein said organic-inorganic composite materials are made up of organic domains and inorganic domains, wherein said organic domains and said inorganic domains have domain sizes not more than 0.1 μm.

15. The multi-layer laminate according to claim 1, comprising at least seven of said layers.

* * * * *